United States Patent [19]

Hodlewsky

[11] Patent Number: 4,858,751
[45] Date of Patent: Aug. 22, 1989

[54] WIDE CHAIN CONVEYOR ASSEMBLY
[75] Inventor: Wasyly G. Hodlewsky, Greendale, Wis.
[73] Assignee: Rexnord Corporation, Milwaukee, Wis.
[21] Appl. No.: 167,648
[22] Filed: Mar. 14, 1988
[51] Int. Cl.$^4$ .................... B65G 23/06; B65G 15/08; B65G 21/10
[52] U.S. Cl. .................... 198/834; 198/325; 198/861.1
[58] Field of Search ............ 198/325, 635, 834, 851, 198/853, 861.1

[56]  References Cited

U.S. PATENT DOCUMENTS

| Re. 30,341 | 7/1980 | Lapeyre et al. | 198/834 |
|---|---|---|---|
| 3,137,382 | 6/1964 | Conover | 198/325 |
| 3,315,777 | 4/1967 | Margles | 198/325 |
| 4,438,838 | 3/1984 | Hodlewsky et al. | 198/853 |

FOREIGN PATENT DOCUMENTS 0884727  11/1971  Canada .................... 198/325

Primary Examiner—Andres Kashnikow
Assistant Examiner—Timothy Newholm
Attorney, Agent, or Firm—Michael, Best & Friedrich

[57] ABSTRACT

A conveyor assembly comprises a frame having a longitudinal axis, a drive shaft rotatably supported by the frame and extending generally perpendicular to the axis, and a plurality of drive sprockets mounted on the drive shaft for rotation therewith, all of the sprockets being axially movable relative to the drive shaft. The assembly also comprises a conveyor belt driven along the axis by the sprockets, the belt having a width measured along a line extending generally perpendicular to the axis. The assembly also comprises a center fingered transfer plate fixed to the frame, a first outer fingered transfer plate which is located on one side of the center plate and which is movable relative to the frame along a line extending generally perpendicular to the axis, and a second outer fingered transfer plate which is located on the other side of the center plate and which is movable relative to the frame along a line extending generally perpendicular to the axis.

10 Claims, 4 Drawing Sheets

WIDE CHAIN CONVEYOR ASSEMBLY

BACKGROUND OF THE INVENTION

The invention relates to wide mat-type conveyors made up of links or modules connected together in chain-like fashion and driven by a drive shaft and sprocket assembly. More specifically, the invention is concerned with an improved arrangement for maintaining the conveyor belt in proper alignment with the conveyor frame despite fluctuations in belt width caused by drastic changes in temperature.

U.S. Pat. No. 4,438,838 discloses a chain link conveyor belt formed of a plurality of pivotally interlocking and substantially rectangular modules. Both interlocking ends of each module include a series of spaced link ends having central apertures to permit the insertion of a pivot pin which joins adjacent modules in interlocking fashion. Each module also includes a support portion which connects the two sets of link ends of the module and which is used for conveying loads. Both the width and the length of the belt may be varied by changing the number and/or the width of the modules.

The conveyor link modules can be made of a variety of materials, but they are preferably made of any one of various types of plastic for reasons of cost efficiency, weight reduction and corrosion resistance. Also, this type of conveyor is commonly used in processing facilities in which products are conveyed from one processing step to another. Often, these processing steps entail drastic changes in environmental conditions such as temperature and humidity. Fluctuations from room temperature to −50° F. or from room temperature to 212° F. are not uncommon. These extreme variations in the conveying environment cause changes in conveyor dimensions due to the expansion and/or contraction of conveyor modules. Consequently, the materials used in the conveyor support and drive apparatus must be capable of both withstanding extreme environmental fluctuations and adapting to changes in conveyor belt dimensions.

U.S. Pat. Re. No. 30,341 to Lapeyre discloses a conveyor sprocket and drive shaft assembly in which the central sprocket is locked to a drive shaft, while the remaining sprockets are free to move axially in either direction to adapt to fluctuations in chain width. Although this design appears to solve the problem of fluctuations in conveyor width, in many applications this arrangement is unsatisfactory. This is due in great part to the fact that the Lapeyre sprocket and drive assembly is "especially designed for use with a chain link conveyor belt of the type described in the aforementioned U.S. Pat. No. 3,870,141 . . ." (Re. 30,341, col. 2, lines 29-31).

The conveyor belt disclosed by Lapeyre is formed of modules provided with relatively narrowly spaced elongate members connecting sets of link ends. The link ends of sequential modules are connected in interlocking fashion by an elongate pin to form a conveyor belt as described above. The narrow spaces between adjacent elongate members serve as sprocket tooth pockets for the teeth of the conveyor drive sprockets, allowing each tooth to drivingly engage a link end of the adjacent connected conveyor module. Thus, the teeth of the single locked drive sprocket will engage the belt between the same two elongate members of the centrally-disposed modules with each cyclical rotation of the belt. The two elongate members as well as the sprocket teeth will be subject to wear due to bi-directional, laterally-directed loads caused by expansion and contraction of the belt as well as by uneven belt loading, shaft misalignment and other inaccuracies in conveyor manufacture. The relatively narrow spacing between adjacent elongate members, coupled with the close fit of the sprocket teeth between the members, does not accommodate significant lateral variation of the belt alignment before sprocket/belt meshing problems are encountered. When the conveyor belt is made of plastic, as is the case with the preferred Lapeyre embodiment, the elongate members and particularly the sprocket teeth are particularly subject to failure caused by this combination of wear and lateral misalignment.

In addition, Lapeyre teaches the use of a pair of C-clips to secure the locked drive sprocket to the shaft so as to prevent axial movement thereon. One clip is placed on either side of the sprocket, and the clips retain the sprocket on the shaft by means of grooves cut into the corners of the shaft. It is common engineering knowledge that the cutting of such grooves into a shaft will weaken the shaft. Conveyor drive shaft strength is often critical, due to the amount of loading of the conveyor belt, and this principle applies to conveyors made of plastic as well as metal.

Lastly, it is time consuming to assemble and maintain an extra-wide conveyor drive when C-clips are used to retain the sprockets, and C-clips are often unavailable for shafts having larger cross sections.

SUMMARY OF THE INVENTION

An object of the invention is to provide an arrangement which maintains the conveyor belt in proper alignment with the conveyor frame despite fluctuations in the width of the belt caused by extreme temperature variations, wear, side loads, etc.

It is another object of the invention to provide a drive sprocket apparatus which permits width fluctuations of wide conveyor mats formed of several modular links connected at the sides.

More particularly, the invention provides a sprocket and drive shaft assembly for a wide conveyor belt composed of modules or links pivotally connected in chain-like fashion and subject to fluctuations in width due to extreme environmental conditions. The assembly comprises a rigid drive shaft having a uniform, noncircular cross section, upon which is mounted a plurality of toothed sprockets. Each of the sprockets includes a hub having an axial bore which corresponds to the cross section of the drive shaft and which permits the sprockets to slide axially on the shaft. Axial movement of the drive sprockets is not restricted other than by engagement with the conveyor belt. As the belt expands, all of the sprockets are free to move axially on the shaft to accommodate the expansion, thus maintaining engagement of the sprockets with the belt.

Belt tracking, or alignment of the belt with the conveyor frame, is maintained by a plurality of fingered transfer plates which are mounted on the conveyor frame, which include fingers extending into aligned grooves or recesses in the upper surface of the conveyor belt and which are arranged in end-to-end relationship across the width of the conveyor belt. A center plate or pair of plates is fixed to the frame, and outer plates on either side of the center plate(s) are mounted on the frame for limited movement relative to the frame along a line extending perpendicular to the direction of belt movement. Thus, the center plate or pair of plates aligns the belt with the frame and the outer plates permit variation of the width of the belt.

In addition, the conveyor belt is preferably provided with sprocket tooth pockets having a lateral dimension which increases the freedom of the sprockets to move axially on the shaft.

Thus, the arrangement of the present invention maintains driving engagement of the drive sprockets with wide span, mat-like conveyor belts, despite fluctuations in belt width and lateral belt misalignment.

The present invention is also compatible with conveyors that are widened by connecting similar modules in side-to-side fashion.

Figure 1:
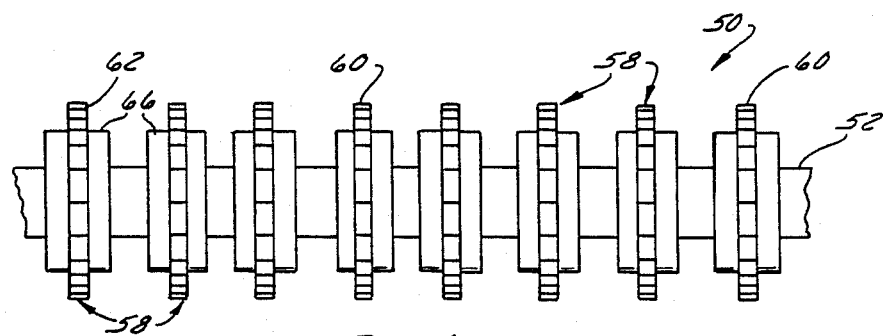
FIG. 1 is an elevational view of a conveyor drive shaft and sprocket assembly that is part of a conveyor assembly embodying the invention.

Before one embodiment of the invention is explained in detail, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DESCRIPTION OF THE PREFERRED EMBODIMENT

A conveyor assembly 1 embodying the invention is illustrated in the drawings. The conveyor assembly 1 comprises (see FIG. 5) a frame 2 having a longitudinal axis 4, and a conveyor chain or belt 6 comprised of a plurality of links or modules 10. The conveyor belt 6 is substantially indentical to the belt disclosed in U.S. Pat. No. 4,438,838, which issued Mar. 27, 1984 and which is incorporated herein by reference.

Figure 3:
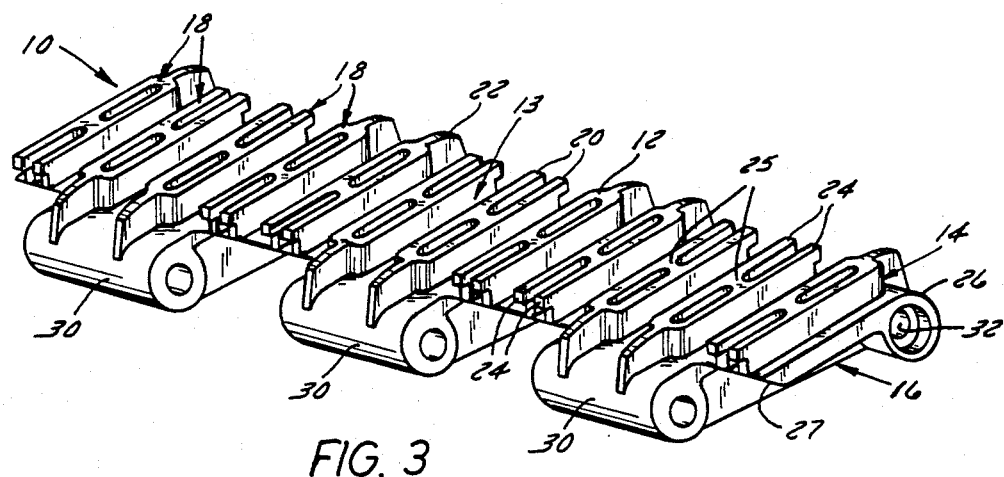
FIG. 3 is a perspective view of a conveyor link that is part of the conveyor assembly.

FIG. 3 is a perspective view of a link or module 10 of the conveyor belt. FIG. 3 shows the top surface of link 10, which is preferably made of a molded polymeric material. Plastic materials having the following characteristics are preferred: strength combined with light weight, wear and impact resistance, compatibility with a variety of atmospheres, resistance to damage resulting from changes in ambient conditions such as temperature, humidity, etc., ease of cleaning and low cost of replacement. Examples of suitable materials are: acetals, nylons, polyethylene, polyesters and polypropylene.

Link 10 includes an integral raised portion 14 and an integral base portion 16. Raised portion 14 is made up of several coplanar fork-shaped members 18 which are arranged in a regularly spaced row supported by base portion 16. The upper surfaces of all of the members 18 define the upper surface 12 of the link 10, and the fork-shaped members 18 define therebetween a plurality of spaced-apart, generally parallel recesses or slots 13 in the upper surface 12 of the link 10.

Figure 6:
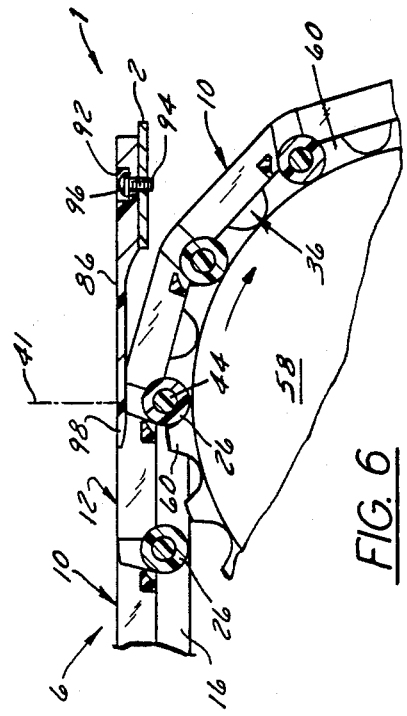
FIG. 6 is a view taken along line 6—6 in FIG. 5.

Each fork-shaped member 18 includes two prongs 20 and a stem 22. The prongs 20 of each fork-shaped member 18 are parallel to each other, and the width of stem 22 is less than the distance between prongs 20 such that the stem 22 of a fork-shaped member 18 on one link 10 will fit between the prongs 20 of the adjacent fork-shaped member 18 on the adjacent link 10 when two links are interconnected end-to-end. The top surface of each stem 22 is curved so as to provide a smooth top surface when links 10 curve around a sprocket as shown in FIG. 6. The ends 24 of prongs 20 are cut away at the bottom in order to permit back-flexing of interconnected links. Each fork-shaped member 18 includes cross-members 25 extending between and connecting prongs 20 approximately at their midpoints to give added strength to link 10.

Figure 4:
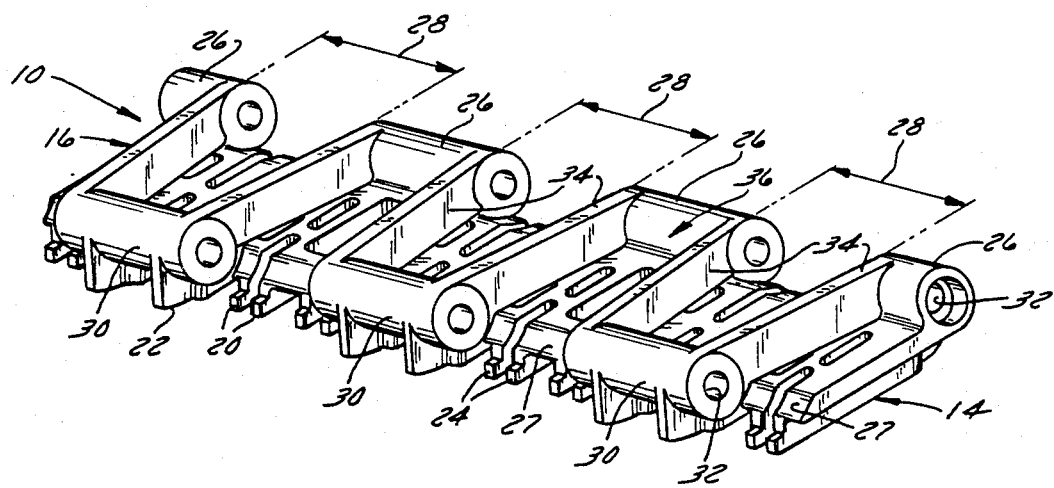
FIG. 4 is a perspective view of the bottom of the link shown in FIG. 3.

FIG. 4 is a perspective view of the bottom side of link 10 and gives a better view of base portion 16. First hollow barrels 26 are axially aligned, with spaces 28 between barrels 26. Second hollow barrels 30 are axially aligned, and the axis of barrels 30 is parallel to the axis of barrels 26 such that barrels 30 are positioned opposite spaces 28. All barrels 26 and 30 have apertures 32 through them to permit the insertion of a pin 42 (see FIG. 7). It should be noted that the outermost barrels 26 are in line with the edge of the raised portion 14, so that the link 10 provides smooth, straight sides for smooth interaction with the conveyor frame 2. Reach bars 34 interconnect barrels 26 and 30 and serve to strengthen link 10. Each reach bar 34 has one end attached to a barrel 26 and the other end attached to a barrel 30. Adjacent reach bars 34 and the barrels 26 and 30 extending therebetween define tooth pockets or recesses 36 adapted to house the tooth of a drive sprocket (described below). Arcs 27 are provided for close hinge design without hinge interference and to avoid trapping of material.

Figure 5:
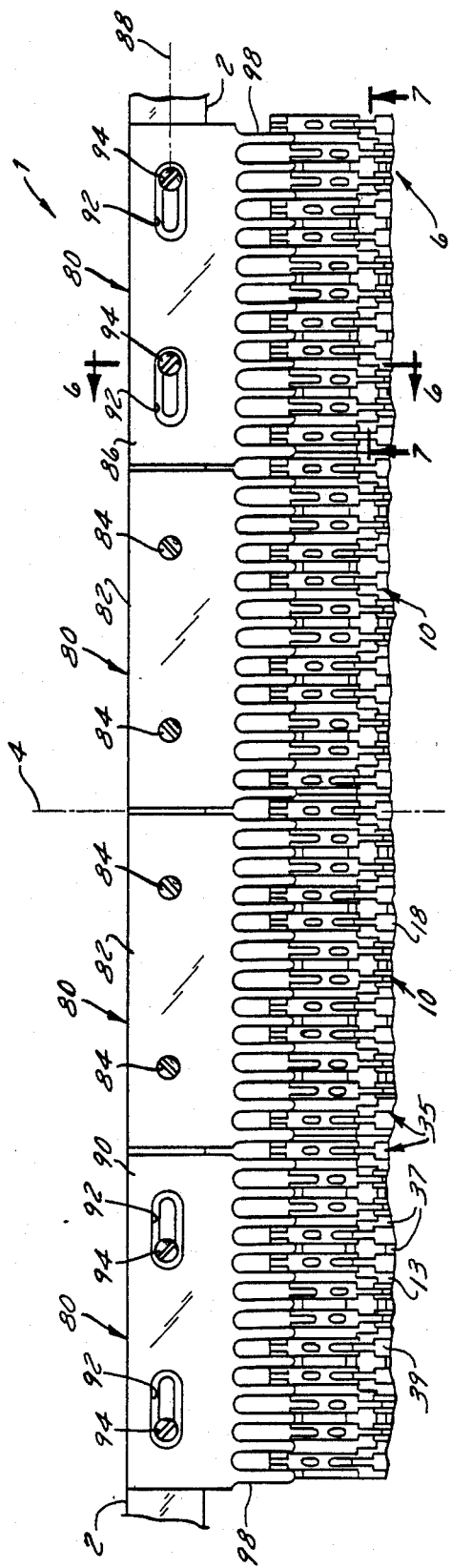
FIG. 5 is a partial plan view of the conveyor assembly.

FIG. 5 shows the conveyor chain 6. When the links 10 are assembled, barrels 30 of one link 10 fit into the spaces 28 between barrels 26 of the next link 10. The resulting chain 6 includes a series of lengthwise, spaced apart, generally parallel strips or ribs 35 defining an upper supporting surface 39 and defining therebetween lengthwise slots 37. The ribs 35 are formed by aligned, end-to-end members 18. The slots 37 are formed by aligned slots or recesses 13 and are adapted to house the fingers 98 of a fingered transfer plate 80 (described below). The chain or belt 6 has a width which is measured along a line extending generally perpendicular to the frame axis 4.

Figure 7:
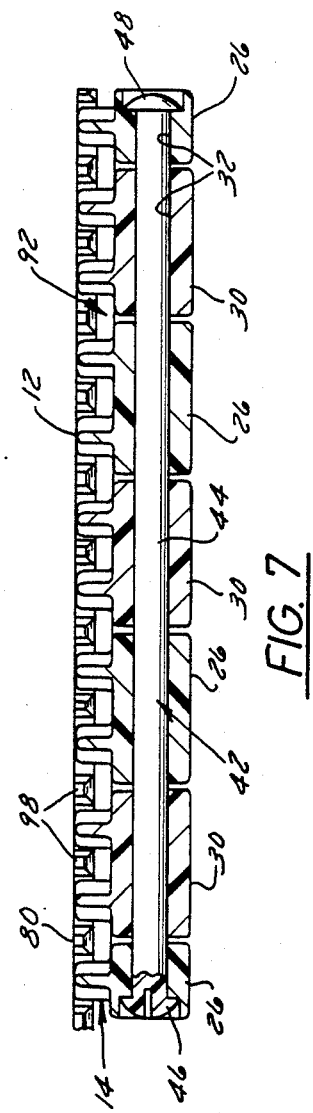
FIG. 7 is a view taken along line 7—7 in FIG. 5.

FIG. 7 is a cross-sectional view of FIG. 5 at the intersection of links 10. Pin 42 is inserted through apertures 32 in barrels 26 and 30 in order to connect links 10. Pin 42 includes a shank portion 44, head 46 at one end of shank 44 and head 48 at the other end. In this embodiment, pin 42 is made of a thermoplastic resin.

The conveyor assembly 1 also comprises means for supporting the conveyor belt 6 on the frame 2 and for driving the belt 6 along the frame axis 4. While various suitable means can be employed, in the preferred embodiment, such means includes a drive shaft and sprocket assembly 50 (see FIGS. 1 and 2).

Figure 2:
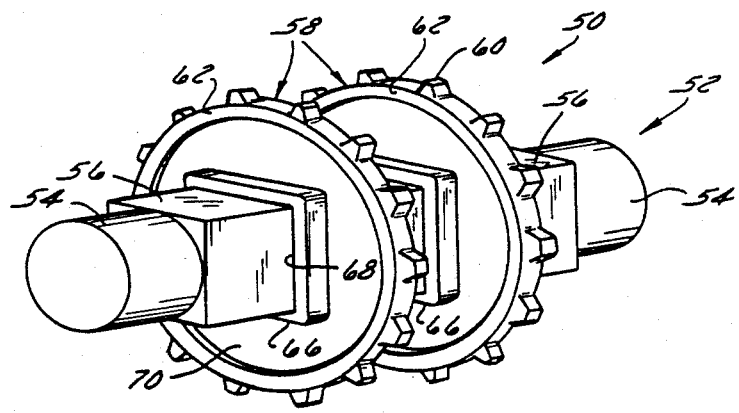
FIG. 2 is a perspective view of an alternative drive shaft and sprocket assembly.

The drive shaft and sprocket assembly 50 includes a drive shaft 52 which is rotatably supported by the frame 2 and which extends generally perpendicular to the frame axis 4. The drive shaft 52 has a polygonal or noncircular cross-section. Drive shaft 52 may be provided with a hexagonal or square cross-section to conform to conveyor industry specifications. Metals such as steel are preferred for strength. Combinations of materials may be employed to advantage. As shown in FIG. 2, a cylindrical steel shaft 54, either solid or hollow, is provided with a sleeve 56 having a square or hexagonal external configuration. Sleeve 56 is formed of aluminum or other material selected because of its lightness, ease of fabrication, e.g. adaptability to molding or extrusion, and/or its resistance to damage by the environment in which it is designed to operate. Sleeve 56 is keyed or pinned to shaft 54 so that a driving connection is established between the sleeve 56 and the shaft 54.

Upon drive shaft 54 of sleeve 56 are arranged a plurality of sprockets 58, the number of which is determined by the width of the belt 6, although a minimum of two sprockets 58 (FIG. 2) is usually required. For best results, it is desirable to have one sprocket 58 for every three to six inches of chain width. The sprockets 58 are fabricated of polymeric materials, preferably plastics having the qualities of temperature resistance, acid resistance and low deformability, etc. as are desired in the module 10. Sprockets 58 are also fabricated by conventional molding means. Suggested materials are acetal, various nylons and polypropylene.

Each sprocket 58 is provided with a plurality of teeth 60, each of which is constructed and arranged to extended into the mating tooth pocket or recess 36 of a module 10 and to drivingly engage a barrel 26 or 30. Teeth 60 are integrally joined to the outer peripheral rim 62 of sprocket 58.

Each sprocket 58 is further provided with a hub 66 having an axial bore 68 constructed and arranged to slidingly engage shaft 54 or sleeve 56, while preventing rotation of the shaft 54 relative to the sprocket 58. Hubs 66 are relatively long axially to provide for maximum driving engagement surface area for contacting the shaft 54 or sleeve 56. The hub 66 is connected to the teeth 60 by a flange or web portion 70 which is relatively thin (axially) and supports the rim 62. Rim 62 is relatively wide in order to provide support for the adjacent end sections of at least two pivotally connected conveyor modules 10.

In most instances, drive shafts will be stainless steel or carbon steel. Both of these materials are resistant to wear resulting from axial motion of the sprockets 58. However, the latter, when formed of plastics, have a low coefficient of friction, thus resulting in ease of axial motion as well as reducing or eliminating drive shaft wear. For particular applications, it may be desirable to form the drive shaft sleeve 56 entirely of a relatively inert material such as stainless steel or a polymeric plastic which is similar to, but not the same as, that used for belt links and/or sprockets.

A recurring problem occasioned by the use of polymeric conveyor components in many processes is that if the axial sprocket bore 68 is too small, the sprocket 58 will not slide on the shaft 54 to compensate for the expansion of the belt 6. Also, the sprocket 58 may "freeze" on shaft 54 due to differential coefficients of expansion and contraction of shaft and sprocket materials. In the present apparatus, axial bore clearance is preferably found within the approximate range of .006" to .060". This amount of clearance has been found to provide adequate lateral slidability without producing any loss of belt tracking.

The conveyor assembly 1 also comprises means independent of the sprockets 58 for aligning the conveyor belt 6 with the frame axis 4 and for permitting variation of the width of the belt 6. While various suitable means can be employed, in the preferred embodiment, such means includes (see FIGS. 5 and 6) a plurality of fingered transfer plates 80 having thereon fingers or projections 98. The transfer plates 80 include a pair of center plates 82 fixed to the frame 2. Preferably, each center plate is fixed to the frame 2 by a pair of bolts or screws 84. The transfer plates 80 also include an outer plate 86 which is located on to the right (as shown in FIG. 5) of the center plates 82 and which is movable relative to the frame 2 along a line 88 extending generally perpendicular to the frame axis 4. The transfer plates 80 also include an outer plate 90 which is located on the left side of the center plates 82 and which is movable relative to the frame along the line 88. While in the preferred embodiment both of the plates 86 and 90 are movable along the line 88, it should be understood that the plates 86 and 90 could be movable along different lines.

Each of the outer plates 86 and 90 has therein a pair of aligned slots 92, and the outer plates 86 and 90 are connected to the frame 2 by bolts or screws 94 extending through the slots 92 (see FIG. 6). The bolts 94 have heads 96 which prevent the plates from pulling away from the frame 2, but the bolts 94 are not completely tightened down so that the transfer plates 86 and 90 are free to slide relative to the frame 2 in either direction until the bolts 94 engage the ends of the slots 92. In order to facilitate sliding movement of the transfer plates 86 and 90 relative to the frame 2 and the bolts 94, the transfer plates 86 and 90 ar preferably made of a low-friction material.

As shown in FIG. 6, top surface 12 of link 10 is in the same plane as the top surface of fingered transfer plate 82. As sprocket 58 rotates in a clockwise direction, articles being carried on top surface 12 of link 10 are transferred onto fingered transfer plate 82. Fingers 98 of fingered transfer plate 82 project beyond the centerline 41 of the barrel 26 which is in contact with sprocket tooth 60 so that the articles being carried by chain 6 are transferred onto fingered transfer plate 82 before chain 6 begins to bend around sprocket 58. It can be seen more clearly in FIG. 6 that base portion 16 is lower than fingers 98 and therefore does not interfere with fingers 98.

When the conveyor assembly 1 is operating, the center transfer plates 82, which ar fixed to the frame 2, align the conveyor chain 6 with the frame axis 4, and the outer plates 86 and 90, which can move relative to the frame 2 along the transverse line 88, allow variation of the width of the conveyor belt 6.

Various features of the invention are set forth in the following claims.

I claim:

1. A conveyor assembly comprising
a frame having a longitudinal axis,
a drive shaft rotatably supported by said frame and extending generally perpendicular to said axis,
a plurality of drive sprockets mounted on said drive shaft for rotation therewith, all of said sprockets being axially movable relative to said drive shaft in response to expansion and contraction of the width of a conveyor belt driven by said sprockets,
said conveyor belt driven in the direction of said axis by said sprockets, said conveyor belt having a width measured along a line extending generally perpendicular to said axis, and said conveyor belt including an upper surface including a plurality of spaced apart slots extending in the direction of said axis, and means independent of said sprockets for aligning said conveyor belt with said axis and for permitting variation of the width of said belt, said means for aligning including a fingered transfer plate including at least one projection fixed to the frame to prevent lateral movement of said projection with respect to the frame, a portion of the projection extending into one of the slots.

2. A conveyor assembly as set forth in claim 1 wherein said fingered transfer plate comprises a center plate, and wherein said means for aligning further includes a first outer plate which is located on one side of said center fingered transfer plate and which is movable relative to said frame along a line extending generally perpendicular to said axis, and a second outer fingered transfer plate which is located on the other side of said center plate and which is movable relative to said frame along a line extending generally perpendicular to said axis.

3. A conveyor assembly as set forth in claim 1 wherein said one projection comprises a center projection, and said means for aligning further includes outer projections which are located on opposite sides of said center projection and each of which is movable relative to said frame along a line extending generally perpendicular to said axis.

4. A conveyor assembly as set forth in claim 1 wherein said conveyor belt is comprised of a plurality of interconnected chain modules.

5. A conveyor assembly as set forth in claim 4 wherein each of said modules includes a lower surface having therein a plurality of recesses, and wherein said drive sprockets include teeth engageable with said recesses to provide a driving connection between said sprockets and said modules.

6. A conveyor assembly comprising
frame having a longitudinal axis,
a conveyor belt having a width measured along a line extending generally perpendicular to said axis, said belt including an upper surface having therein a plurality of spaced-apart slots extending generally parallel to said axis, means for supporting said belt on said frame and for driving said belt in the direction of said axis, and a plurality of projections supported by said frame, each of said projections extending into a respective one of said slots, and said projections including a center projection fixed to said frame to prevent lateral movement of said center projection relative to said frame, and outer projections which are located on opposite sides of said center projection and each of which is movable relative to said frame along a line extending generally perpendicular to said axis.

7. A conveyor assembly as set forth in claim 6 and further comprising a plurality of fingered transfer plates, said plurality of plates including a center plate which is fixed to said frame and which includes said center projection, a first outer plate which is located on one side of said center plate, which includes one of said outer projections and which is movable relative to said frame along a line extending generally perpendicular to said axis, and a second outer plate which is located on the other side of said center plate, which includes the other of said outer projections and which is movable relative to said frame along a line extending generally perpendicular to said axis.

8. A conveyor assembly as set forth in claim 6 wherein said conveyor belt includes a plurality of spaced apart, generally parallel ribs defining an upper supporting surface and defining therebetween said slots.

9. A conveyor assembly as set forth in claim 8 wherein said conveyor belt is comprised of a plurality of interconnected chain modules.

10. A conveyor assembly as set forth in claim 9 wherein each of said modules includes a lower surface having therein a plurality of recesses, and wherein said supporting and driving means includes drive sprockets including teeth engageable with said recesses to provide a driving connection between said sprockets and said modules.

* * * * *